(12) United States Patent
Boovaragavan et al.

(10) Patent No.: US 10,727,492 B2
(45) Date of Patent: Jul. 28, 2020

(54) CURRENT COLLECTORS INCORPORATING ELECTROHYDRODYNAMICALLY DEPOSITED CARBONACEOUS MATERIAL

(71) Applicant: Apple Inc., Cupertino, CA (US)

(72) Inventors: Vijayasekaran Boovaragavan, Cupertino, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 15/709,885

(22) Filed: Sep. 20, 2017

(65) Prior Publication Data

US 2018/0090767 A1    Mar. 29, 2018

Related U.S. Application Data

(60) Provisional application No. 62/398,659, filed on Sep. 23, 2016.

(51) Int. Cl.
*H01M 10/0525* (2010.01)
*H01M 4/66* (2006.01)

(52) U.S. Cl.
CPC ........... *H01M 4/663* (2013.01); *H01M 4/661* (2013.01); *H01M 4/667* (2013.01); *H01M 10/0525* (2013.01)

(58) Field of Classification Search
CPC ... H01M 4/663; H01M 4/667; H01M 10/0525
See application file for complete search history.

(56) References Cited

U.S. PATENT DOCUMENTS

2015/0118554 A1 *   4/2015   Wu .................. H01G 11/26
                                                              429/217

* cited by examiner

*Primary Examiner* — Osei K Amponsah
(74) *Attorney, Agent, or Firm* — Kilpatrick Townsend and Stockton LLP

(57) ABSTRACT

Exemplary energy storage devices, battery cells, and batteries of the present technology may include a cathode active material disposed on a cathode current collector. The devices may also include an anode active material disposed on an anode current collector. At least one current collector of the cathode current collector or the anode current collector may include a continuous layer of a carbon-containing material positioned between the current collector and the active material.

19 Claims, 13 Drawing Sheets

CURRENT COLLECTORS INCORPORATING ELECTROHYDRODYNAMICALLY DEPOSITED CARBONACEOUS MATERIAL

CROSS REFERENCE TO RELATED APPLICATIONS

This application claims the benefit of U.S. Application Ser. No. 62/398,659, filed Sep. 23, 2016, the entire disclosure of which is hereby incorporated by reference for all purposes.

TECHNICAL FIELD

The present technology relates to batteries and battery components. More specifically, the present technology relates to current collectors incorporating carbon-based layers of material.

BACKGROUND

Many rechargeable batteries utilize an electrolyte material of some form to facilitate ion exchange between anode and cathode materials. The electrolyte may be in contact with some or all materials within the battery. Some electrolytic substances can be corrosive or reactive with different materials within the battery including the current collectors.

Thus, there is a need for improved battery and cell designs that reduce and mitigate electrolytic effects within a battery. These and other needs are addressed by the present technology.

SUMMARY

The present technology relates to energy storage devices, including battery cells and batteries, which may include a cathode active material disposed on a cathode current collector. The devices may also include an anode active material disposed on an anode current collector. At least one current collector of the cathode current collector or the anode current collector may include a continuous layer of a carbon-containing material positioned between the current collector and the active material. In embodiments, the carbon-containing material may be an electrohydrodynamically deposited coating.

The cathode current collector and the anode current collector may each include at least one of aluminum, copper, stainless steel, gold, or silver. In some embodiments, the continuous layer of carbon-containing materials may include stacked sheets of graphene in a staggered formation between layers. Additionally, the continuous layer of carbon-containing material may include at least two layers of sheets of graphene positioned along a surface of the current collector. In embodiments, a spacing between the at least two layers of sheets of graphene may be less than or about 10 nm. A thickness of the continuous layer of carbon-containing material may be between about 50 nm and about 500 nm in exemplary devices. For example, in one non-limiting example, the continuous layer of carbon-containing material may be positioned along the cathode current collector. In such a configuration, the cathode current collector may include aluminum, and the thickness of the continuous layer of carbon-containing material may be between about 50 nm and about 150 nm.

In some embodiments, the continuous layer of carbon-containing material may be positioned along the anode current collector. As another non-limiting example, the anode current collector may include copper, and the thickness of the continuous layer of carbon-containing material may be between about 200 nm and about 300 nm. A continuous layer of carbon-containing material may be included adjacent both the cathode current collector and the anode current collector in embodiments, and may be positioned between the respective current collector and the active material disposed thereon. The continuous layer of carbon-containing material may include a reduced oxygen content from heat-treatment of the carbon-containing material or chemical reduction of the carbon-containing material. In embodiments, the continuous layer of carbon-containing material when formed on the at least one current collector may produce an increase in measured sheet resistance of the current collector of less than or about 0.2 mΩ/square. Additionally, in some embodiments the continuous layer of carbon-containing material may include cross-linked layers of graphene disposed on the at least one current collector.

Devices of the present technology may also include battery current collectors, which may include a substrate. The current collectors may also include a coating in contact with a surface of the substrate. The coating may include individual sheets of graphene disposed in layers along the surface of the substrate, and the individual sheets of graphene may be cross-linked with one another on the surface of the substrate.

In exemplary current collectors the substrate may be or include a conductive material including at least one of aluminum, copper, stainless steel, gold, or silver. The coating on the current collector may be the product of an electrohydrodynamically deposited solution of graphene in solvent. The cross-linked sheets of graphene, once formed on the substrate, may be devoid of solvent between the layers along the surface of the substrate in embodiments. In some embodiments the coating may be configured to resist intersheet infiltration of a battery electrolyte after at least 200 CV cycles at 5 mV/s. Additionally, in embodiments the electrohydrodynamic deposition may form an induced stiction between the layers along the surface of the substrate.

Devices of the present technology may also include lithium-ion batteries. In embodiments the batteries may include a cathode active material, and a cathode current collector on which the cathode active material is disposed. The cathode current collector may be or include an aluminum substrate on which a continuous coating of cross-linked layers of sheets of graphene may be formed. The batteries may also include an anode active material, and an anode current collector on which the anode active material is disposed. The anode current collector may be or include a copper substrate on which a continuous coating of cross-linked layers of sheets of graphene may be formed. In one non-limiting example, the continuous coating of cross-linked layers of sheets of graphene may be formed on the copper substrate. The coating may be a 5 V electrohydrodynamically deposited coating characterized by a thickness of at least about 200 nm. Additionally or alternatively, the continuous coating of cross-linked layers of sheets of graphene may be formed on the aluminum substrate. The coating may be a 40 V electrohydrodynamically deposited coating characterized by a thickness of at least about 50 nm.

Such technology may provide numerous benefits over conventional technology. For example, the present devices may provide reduced permeation of electrolytic materials to the current collector. Additionally, the present technology may improve current collector performance by reducing pitting and other material dissolution. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1A:
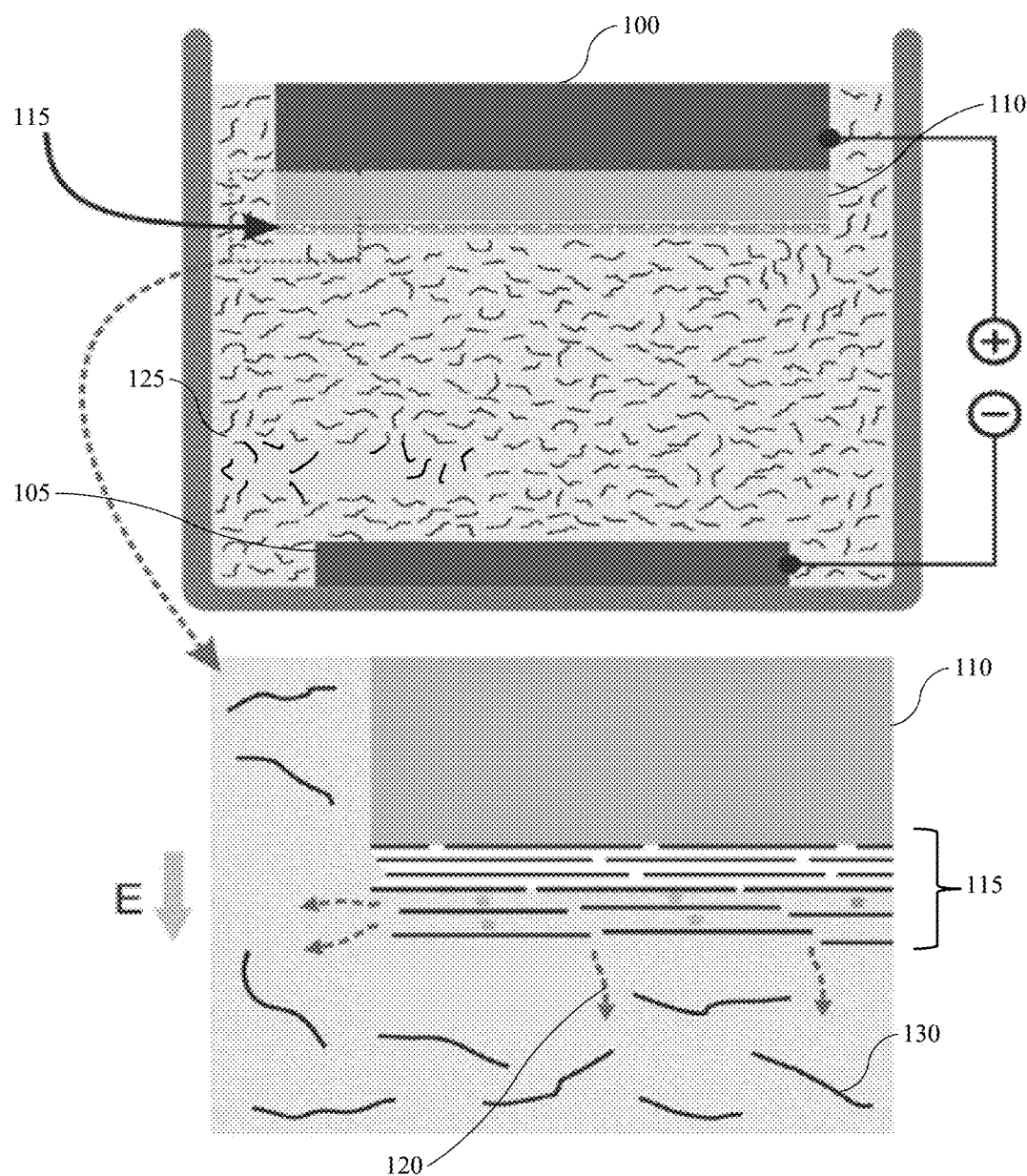
FIG. 1A shows images of an electrohydrodynamic deposition ("EHD") operation according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include additional or exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Corrosive or reactive materials within a battery cell can include the electrolyte that may facilitate operation of the cell. Battery current collectors may be subject to degradation when in contact with these electrolytes or constituents of the electrolytes as the battery experiences charging and discharging operations. These electrolytic materials may have a corrosive effect on the current collectors that may be increased under load. For example, corrosive reactions between metallic current collectors and the electrolyte may cause certain results including (i) consumption of electrolyte and loss of other active materials, (ii) formation of an insulating layer of reaction products atop portions of the current collector, (iii) localized pitting of the relatively thin current collectors, (iv) reduced adhesion between the current collectors and their respective electrodes, or (v) dissolution of metallic ions into the electrolyte. These phenomena can increase the internal cell impedance within the battery, reduce capacity and rate performance, cause cell short circuits, and may generally shorten battery life and reduce capacity.

Coating the battery current collector may be performed to address certain of these phenomena. Some conventional coatings have been formed by deposition or casting. For example, a casting operation may include applying a material, such as a colloidal suspension, onto the current collector by a variety of techniques, such as tape casting or doctor blading, dip coating, spin coating, or other application techniques followed by a drying operation to remove solvents and other materials to aid application. Many of these coatings may be at least 400 nm or more in thickness to provide continuity and mechanical stability. By incorporating this increased thickness, cell capacity may be reduced due to a corresponding reduction in electrode active material to accommodate this thickness.

Additionally, some of these conventional techniques may contain flaws created by the removal of the suspension solvent through evaporative drying. When drying is performed to remove solvents from the structure, filtration channels within the coating may be formed and will remain subsequent the evaporation. Depending on the material used for the coating, some conventional application techniques may not bring the particles or materials into the closest contact separation with each other during liquid removal, and thus permeable paths may remain. Once the electrolyte is introduced to the cell, the electrolyte may flow within these paths and begin the corrosion detailed above. In addition, when coatings are formed into films with increased thicknesses that may be greater than 500 nm, or 1 µm or more, the films may not exhibit sufficient flexibility or compliance to reduce the occurrence of damage during transfer and/or fitting to the item to be covered.

The present technology may improve on many of these techniques by providing battery current collectors including electrohydrodynamically deposited ("EHD") coatings. The coatings may be of any number of materials that may be deposited electrohydrodynamically, and in some embodiments these materials may be carbonaceous materials. Coatings of the present technology may be or include thin films, layers, membranes, skins, casings, coatings, sheaths, and tapes. Coatings of the present technology may be characterized by one or more layers of individual sheets of graphene disposed in layers along a surface of a substrate, cross-linked individual sheets of graphene, as well as additional types of carbonaceous material. The coatings may include ordered particles or stacked and staggered sheets of carbonaceous precursors.

The EHD processes of the present technology may be utilized to reduce or inhibit the consumption of electrolyte or other active materials. Additionally, the coatings formed may aid in the reduced formation of an insulating layer of reaction products in contact with current collectors, the reduction or prevention of localized pitting of current collectors, reduced adhesion between the current collectors and their respective electrodes, as well as the reduction or prevention of dissolution of metallic ions into the electrolyte. Coatings of the present technology may inhibit or reduce one or more components of the battery electrolytes from contacting the substrate or current collectors.

The EHD processes of the present technology may include and initiate electrophoretic attraction of particles and/or molecular sheets of carbonaceous material toward the deposition surface when particles are distal to the substrate surface. The process may convert to EHD when the particles or molecular sheets are proximal to the substrate surface, which may be a distance of about 1 µm to about 5 µm or less. Within this distance or range, the carbonaceous material may be repelled by the surface of the substrate. For example, aluminum substrates may include negatively charged oxides that may repel the negatively charged graphene sheets. However, the applied field may assist or cause the graphene sheets to overcome the repulsion and successfully adhere to the substrate surface.

Graphene sheets can be formed in a manner to be mutually repulsive, which may result in their uniform dispersion in solution. The present EHD processes may advantageously reduce or inhibit the immediate adherence of the carbonaceous material to itself or to the substrate surface. Instead, embodiments of the present technology may promote the lateral movement of the carbonaceous material proximate the substrate surface and produce stacked and staggered layers of carbonaceous material sheets. Adherence of the individual graphene sheets to the substrate surface may subsequently be induced by overcoming the repulsive effects, for instance, with an interim potential pulse of sufficient intensity to overcome repulsive van der Waals forces. These forces may be about 100 kJ/mol, and thus a sufficient pulse of energy may be applied to overcome this repulsion. This may also distinguish other electrophoretic deposition processes that may use a DC field that brings particles or molecular sheets to the substrate in a manner that induces particle adherence to the surface upon first contact, which may prevent the continuous sheet structure of the present technology.

The present technology may improve on many conventional techniques at least in part due to the use of individual sheets of graphene. The present sheets may allow improved packing efficiency as compared to other particulate or shaped matter. By utilizing the graphene sheets of the present technology, the formed layers may lack the voids that may be observed between the particle junctions of other shaped materials, such as spherical materials. For other shaped materials, the densest packing may be unable to surpass a limit of 74% packing efficiency or lower. Other techniques may be incapable of forming single crystalline patterns unlike the present technology, which may allow improved packing efficiency up to complete coverage.

Figure 1B:
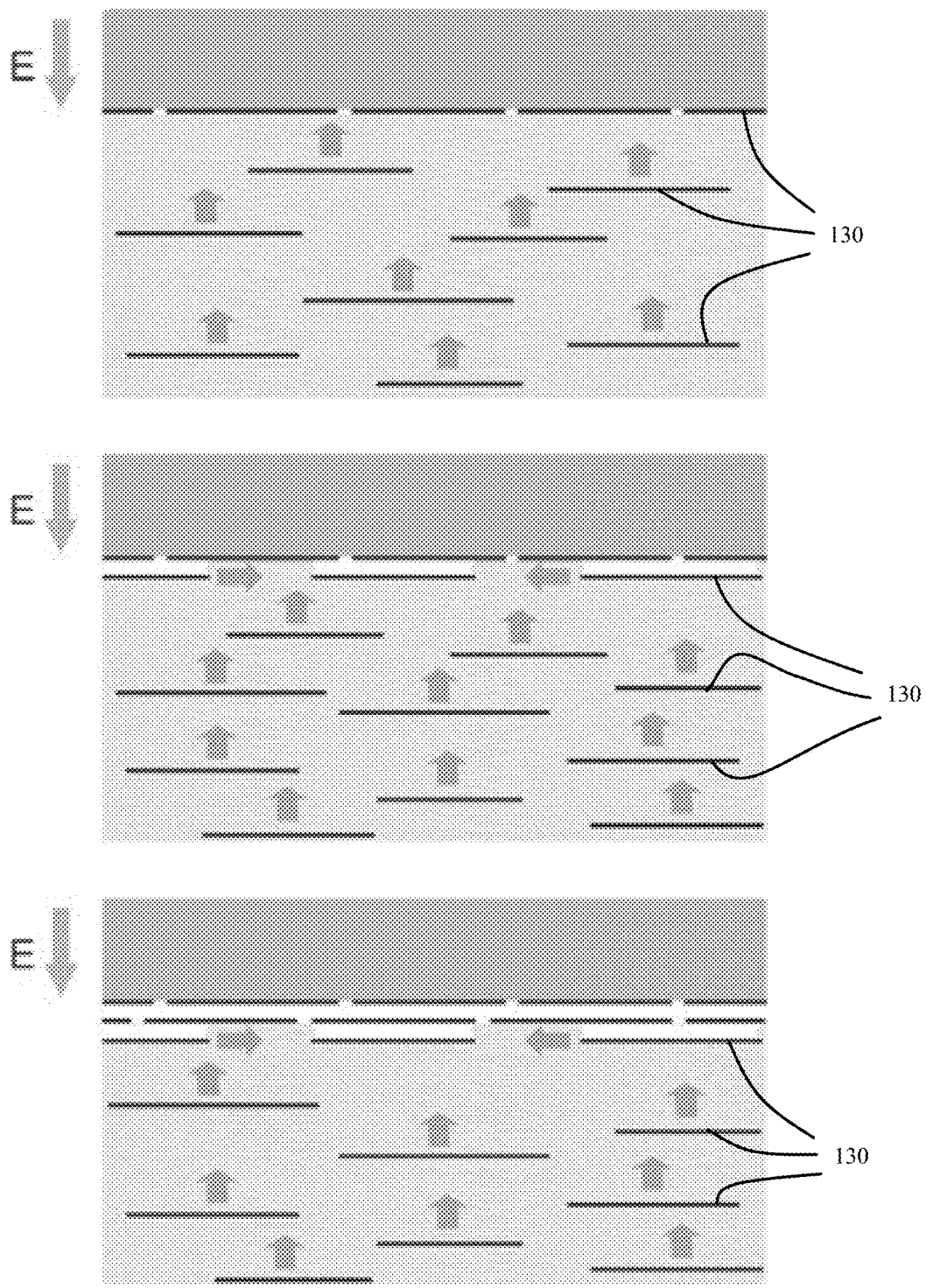
FIG. 1B shows additional detail of the EHD operation of FIG. 1 according to embodiments of the present technology.

FIGS. 1A and 1B show exemplary operations of the EHD process according to embodiments of the current technology. FIG. 1A illustrates a version of the EHD process, which includes electrodes 100 and 105 at least partially submerged in suspension 125. The suspension 125 may include individual graphene sheets 130 suspended in a solvent. Electrodes 100 and 105 may represent a cathode and anode, respectively. Substrate 110 may be positioned in electrical communication with electrode 100. When present, substrate 110 may be or include an electrically conductive, semiconducting, or non-conductive material. In embodiments, the substrate may not be included in the process where the electrode is the substrate on which the carbonaceous material may be applied. A DC electrical field may be applied between electrodes 100 and 105 to attract the individual graphene sheets towards electrode 100 and initiate the formation of coating 115. Suspension 125 may include one or more types of carbonaceous material in embodiments, and the carbonaceous material may be characterized by a two-dimensional plate-like structure.

Coating 115 may include one or more layers of carbonaceous material 130 formed over a surface of the substrate, and in embodiments may produce a multi-layered structure. The multi-layered structure may be characterized by a defined spacing between the layers of carbonaceous material 130, which may be a similar spacing between successive layers of the carbonaceous material. Depending on the desired thickness, coating 115 may be formed within about 3 seconds and up to about 30 minutes. Substrate 110 or electrode 100 may be or include a metal suitable for use as a current collector in batteries including lithium-ion batteries. In some embodiments, the substrate or electrode may be or include copper, aluminum, nickel, silver, gold, stainless steel, a carbon-containing material, or a conductive ceramic or other material.

Graphene sheets applied by these techniques may produce a coating 115 that may be thermally stable, electrochemically stable, resistant to abrasion, and generally chemically inert. Although inert to many chemicals, such as those included in electrolytes, the coating may be further processed to reduce an oxygen content of the coating. The oxygen content of the individual graphene sheets may be adjusted to adjust the electrical conductivity of coating 115. The adjustment may be performed by a thermal, radiative, or chemical reduction of graphite oxide, as one non-limiting example. In embodiments the reduction may be performed subsequent the deposition and aggregation on the substrate. In other embodiments the oxygen reduction may be formed before the carbonaceous material has been suspended, or while included within a suspension.

The EHD process may utilize an AC or DC electric field to induce the deposition or to overcome the repulsive forces. This may be different than some electrophoretic deposition ("EPD") operations where the process is only capable of performance under a DC field. Additionally, during the present EHD, solvent may be excluded from between the layers of coating 115 as shown via dashed arrow 120 in FIG. 1A. This may result in the formation of a homogeneous structure that may be continuous across the entire surface to which it is applied. The formation may also be void of filtration channels previously discussed because the process itself may cause the exclusion of solvent from within the coating or structure. Depending on the process parameters and application, coating 115 may be characterized by an intersheet separation of less than or about 20 nm. In some embodiments the intersheet separation may be less than or about 18 nm, less than or about 16 nm, less than or about 14 nm, less than or about 12 nm, less than or about 10 nm, less than or about 9 nm, less than or about 8 nm, less than or about 7 nm, less than or about 6 nm, less than or about 5 nm, less than or about 4 nm, less than or about 3 nm, less than or about 2 nm, or less in embodiments.

Once the first layer of carbonaceous material has been deposited and connected across the surface of the substrate or electrode, a subsequent layer may be formed adjacent the first layer through the same or a modified EHD process as illustrated in FIG. 1B. This process of forming individual layers may also promote lateral movement of carbonaceous material 130 when proximate to the substrate. This may produce dense, stacked, and staggered layers in which potential gaps and surface defects may be reduced or eliminated. Additionally, by forming a densely packed structure having intersheet separations of less than or about 10 nm, the layers may operate as a network to limit permeation of materials through the coating.

In some embodiments, the EHD-induced lateral movement of the carbonaceous material may facilitate or allow the formation of dense layers. Other deposition techniques may not produce similar results because the carbonaceous material may not otherwise have the ability to shift upon surface contact. For example, under EPD, the thickness of coating 115 may increase as the electric field increases. However, gaps and surface defects on a substrate may result in a localized reduction of the electric field within the void of these structures, although the field may be increased about the edges of the voids. Consequently, the coating material may primarily adhere to the edges of the structures as opposed to the internal surface. Because the process may not provide lateral movement of the deposited coating material, the resultant coating may include columns of carbonaceous material around the void. This may not only fail to provide a uniform surface coating, but may actually form channels through the coating formed towards the void in the substrate.

In contrast, EHD utilizing the present technology may induce lateral movement of the carbonaceous material when proximate to the substrate surface. This may allow or cause the carbonaceous material to shift into a uniform position, which may cover the void and reduce or eliminate column formation. Such a feature may produce the continuous surface coating that may not be feasible with other formation techniques. Moreover, the lateral movement may similarly induce stiction, or adherence between layers, by overcoming the material repulsion. In embodiments, this stiction may be induced, for example, with an interim potential pulse of sufficient intensity to adhere one layer to another and cause friction between the layers that may induce stiction.

The EHD process can also be utilized to form patterned coatings by inducing current density variations on the substrate surface. Accordingly, perforated materials and other designs may be coated without encroaching the perforations or other surface features that may be maintained without a coating. The thickness of the coating and contact separation between the carbonaceous sheets and substrate, when present, or electrode may be controlled by modifying the intensity from about 1 V to about 40 V. Additionally, duration may be adjusted from about 3 seconds to about 30 minutes of the applied field. The coatings achieved using the EHD process may be compliant and exhibit a reduced likelihood of damage during subsequent application and processing. Because of the dense formation of the individual layers as well as between layers, stronger coatings may be produced both from a permeation perspective as well as in how the layers may be less prone to damage from other processes or during battery formation.

Coating 115 may be formed by the present technology in a manner to specifically cover pit holes and surface defects of the substrate. This phenomenon may be performed at least in part due to the EHD process of the present technology that may promote the lateral motion of sheets on the surface of the substrate. FIG. 2 shows AFM imaging of aluminum foil according to embodiments of the present technology. The AFM imaging utilized a Veeco Digital Instruments® Nanoscope IIIA type Atomic Force Microscope in contact mode with a silicon nitride probe. To determine the uniformity and extent of coverage of the aluminum surface with the carbonaceous material and to measure the thickness the coating, the AFM was operated in contact mode with the silicon nitride probe. Pitting of current collector materials may be inherent to the materials received by manufacturers. Because of the processes seek to form relatively thin current collectors, the pitting may be an unavoidable result. To demonstrate the coverage of the pits with carbonaceous material formed by the present technology, the AFM was used in tapping mode with an antimony doped silicon probe. The magnitude of the deflection of the cantilever was recorded to calculate the tip-sample interaction forces.

Figure 2A:
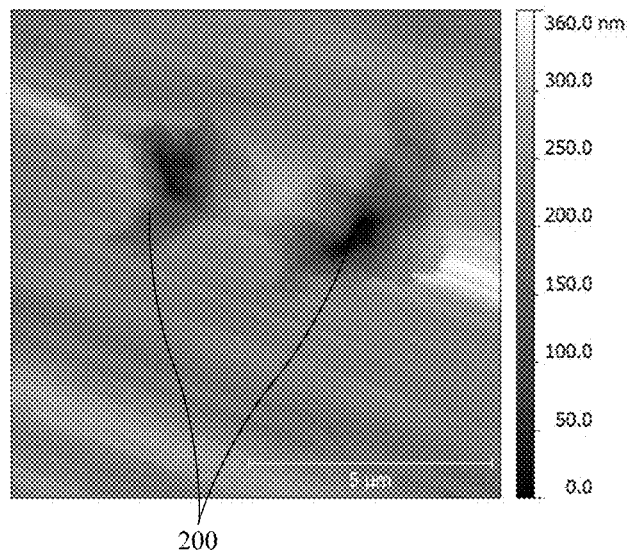
FIGS. 2A-2B show atom force microscopy ("AFM") images of EHD-coated and uncoated aluminum foil according to embodiments of the present technology.
Figure 2B:
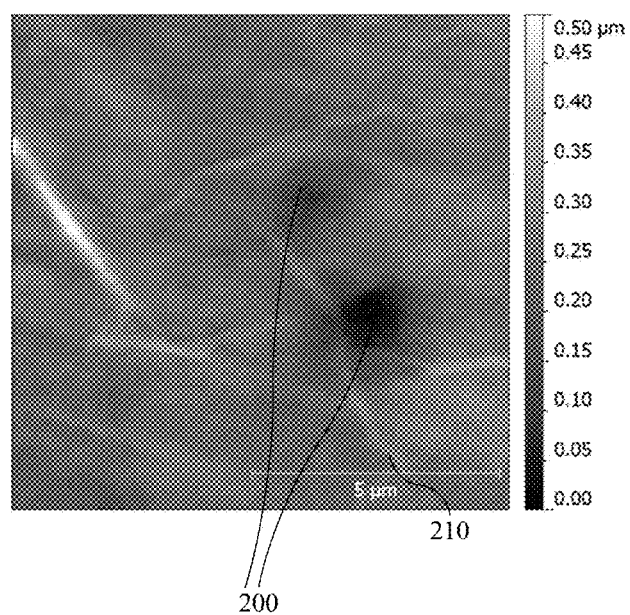

FIG. 2A shows an AFM image of an aluminum foil sample prior to undergoing EHD processing according to the present technology. Defects 200 show pit holes and surface defects of the substrate as received, and prior to undergoing EHD processing. The defects 200 were characterized by a width of about 1-4 microns and depth of about 200-300 nm. FIG. 2B depicts an AFM image of the aluminum foil shown in FIG. 2A subsequent to undergoing EHD processing according to the present technology. As shown in the image, defects 200 were overlaid with an EHD coating of the carbonaceous material. Wrinkles 210 illustrated along the surface are a characteristic of the individual graphene sheets, and are visible on the top of the pit holes and surface defects as non-linear formations. This confirms that the imperfections were fully covered by the EHD coating of carbonaceous material.

Carbonaceous material 130 for use in the present technology may be prepared from a variety of graphene sources including but not limited to graphite, graphite oxide or oxidized graphite, carbon black, as well as vaporized carbon precursors. Carbonaceous material 130 may be dispersed in solvent prior to coating production. A variety of solvents may be utilized that may both produce a uniform mixture of materials, and maintain the carbonaceous material from agglomerating prior to formation at the electrode. Examples of applicable solvents may include, but are not limited to, water, ammoniated water, organic solvents, alcohols including ethanol and isopropanol, water/alcohol mixtures such as ethanol/water or isopropanol/water, esters and carbonates, which may include ethylene carbonate or propylene carbonate, dimethylformamide ("DMF"), N-methylpyrrolidone ("NMP"), acetonitrile, and dimethylsulfoxide ("DMSO"). Multi-component solvents including water and/or an organic solvent, such as alcohol and water, may be used to improve the dispersion state of the carbonaceous material. For example, one or more components, such as water, may operate as a dispersant through specific adsorption on the surface of the sheets, while other components, such as alcohol, may be compatible with the wettability of the substrate.

The concentration of the carbonaceous material 130 in suspension 125 can be about 0.1 mg/mL to about 5 mg/mL in embodiments. In some embodiments an increased concentration may produce a thicker coating when the EHD process is performed. Additionally, in embodiments the concentration of carbonaceous material may be about 0.5 mg/ml to about 4 mg/mL, less than or about 4 mg/mL, less than or about 3.5 mg/mL, less than or about 3 mg/mL, less than or about 2.5 mg/mL, less than or about 2 mg/mL, less than or about 1.5 mg/mL, less than or about 1 mg/mL, less than or about 0.5 mg/mL, greater than or about 0.1 mg/mL, greater than or about 1 mg/mL, greater than or about 2 mg/mL, greater than or about 3 mg/mL, greater than or about 4 mg/mL, or within a smaller range included within any of these ranges, or between any of the numbers listed.

The individual graphene sheets may be dispersed in solvent using any suitable mixing method, including, but not limited to, ultrasonication and stirring. In certain embodiments, ultrasonication may be utilized to reduce a quantity of aggregates despite that ultrasonication may result in a decreased width of the carbonaceous material. When aqueous suspensions are utilized with the EHD operations, variations in solvent pH may be used to facilitate coating formation, depending on the nature of the carbonaceous material used. Despite that ultrasonication may reduce the quantity of aggregates in the dispersion, such a process may allow improved packing of the carbonaceous material when formed into a coating, which may improve the previously discussed characteristics of the coating.

The intensity of the applied field can be from about 1 V to about 50 V during the EHD in embodiments. The applied field may be adjusted based on coating thickness as well as the material to which the coating is being applied. In some embodiments, the applied field may be between about 1 V and about 10 V, while in other embodiments the applied field may be between about 35 V and about 45 V. For example, the applied field for an aluminum substrate may be higher than the applied field for a copper substrate, and the applied field for a limited formation may be less than the applied field for a thicker coating. In other embodiments the applied field may be greater than or about 1 V, greater than or about 5 V, greater than or about 10 V, greater than or about 15 V, greater than or about 20 V, greater than or about 25 V, greater than or about 30 V, greater than or about 35 V, greater than or about 40 V, greater than or about 45 V, or greater than or about 50 V, along with any other voltages or ranges of voltages encompassed by these ranges.

In some suspensions utilized for EHD, the carbonaceous material may be negatively charged and may deposit on the positive electrode. The intensity of the electric field can be varied during deposition to change the rate of deposition, where an increase in intensity may result in an increased deposition rate. The electric field may also be used to create or form graded structures of the coating across the surface. Adjusting the electric field may also be performed to overcome an increasing electrical resistance of the deposited layer on the substrate. This may be caused as an increasing thickness of the deposited coating is formed. In embodiments that utilize AC, the polarity of the electric field may be reversed to alternate deposition of the carbonaceous material onto the substrate and also onto another component having an opposite charge relative to the carbonaceous material.

The electric field can be applied for between about 10 seconds and about 30 minutes in embodiments. This may also depend on the thickness sought for the coating, as well as the materials used for the coating and the materials to which the coating may be applied. In embodiments, the electric field may be applied for greater than or about 15 seconds, greater than or about 30 seconds, greater than or about 45 seconds, greater than or about 1 minute, greater than or about 5 minutes, greater than or about 10 minutes, greater than or about 15 minutes, greater than or about 20 minutes, or greater than or about 30 minutes. The electric field may also be applied for less than or about 25 minutes, less than or about 20 minutes, less than or about 15 minutes, less than or about 10 minutes, less than or about 5 minutes, less than or about 1 minutes, or less than or about 30 seconds, as well as within any smaller range encompassed by any of these ranges, such as between about 5 minutes to about 10 minutes, for example. Once the desired thickness of coating has been formed, the electric field may be removed and the coated electrode may be removed from suspension. As explained previously, the dense packing of the layers and intralayer coverage may produce compact and durable coatings that may resist breakage or damage. For example, the formed coatings may be resistant to damage from washing and/or removal via adhesive tape.

The thickness of coating 115 may at least in part be a function of the extent of the EHD process, as well as the materials being applied and being worked. However, the present EHD processes may produce layers of graphene coating that may be characterized by a coating thickness of between about 1 nm and about 30 µm, between about 5 nm and about 500 nm, between about 50 nm and about 150 nm, or between about 200 nm and about 300 nm. In some embodiments the thickness may be between about 1 nm and about 50 nm, although in other embodiments the thickness of the coating may be greater than or about 50 nm to provide a coating that is unlikely to include voids within the coating. Coatings according to the present technology may also be characterized by a thickness of greater than or about 100 nm, greater than or about 200 nm, greater than or about 300 nm, greater than or about 400 nm, greater than or about 500 nm, greater than or about 600 nm, greater than or about 700 nm, greater than or about 800 nm, greater than or about 900 nm, greater than or about 1 µm, greater than or about 5 µm, greater than or about 10 µm, greater than or about 15 µm, greater than or about 20 µm, greater than or about 25 µm, greater than or about 30 µm, greater than or about 35 µm, greater than or about 40 µm in embodiments, less than any of these ranges, or within any smaller range encompassed by these numbers or ranges. Depending on the device set-up, material available for deposition, and time the electric field is applied, the thickness of the applied coating may not be limited.

As noted, the thickness of coating 115 typically may increase as the duration of the applied electric field increases. Coating 115 may also be formed in a manner to reduce resistance to ion transport through the carbonaceous coating by reducing a contact resistance between a battery active material and the respective current collector. Additionally, subsequent to the formation of coating 115, carbonaceous material 130 may be reduced or subjected to additional processing to render it more suitable for the intended application, which may include use as a current collector for an energy storage device. Subsequent processing may involve thermal, radiative, and/or chemical processes to change the nature of exposed surfaces and/or change the electrical conductivity by removing oxygen from the coating.

Figure 3:
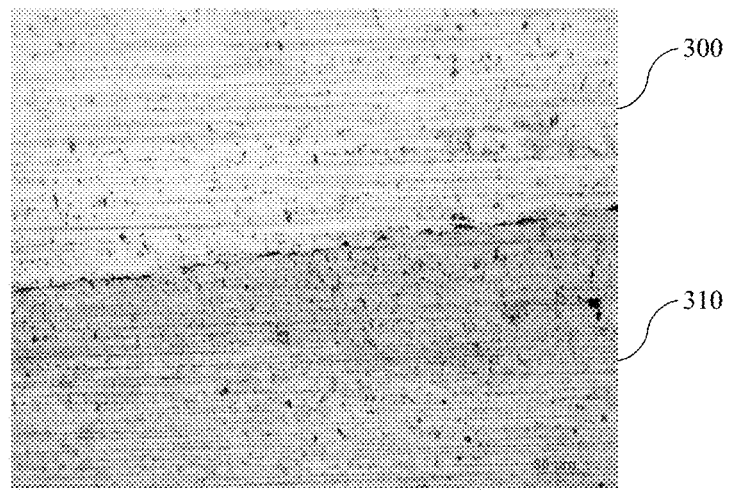
FIG. 3 shows an optical microscopy ("OM") image of an aluminum substrate comprising an EHD-coated and uncoated region according to embodiments of the present technology.
Figure 4:
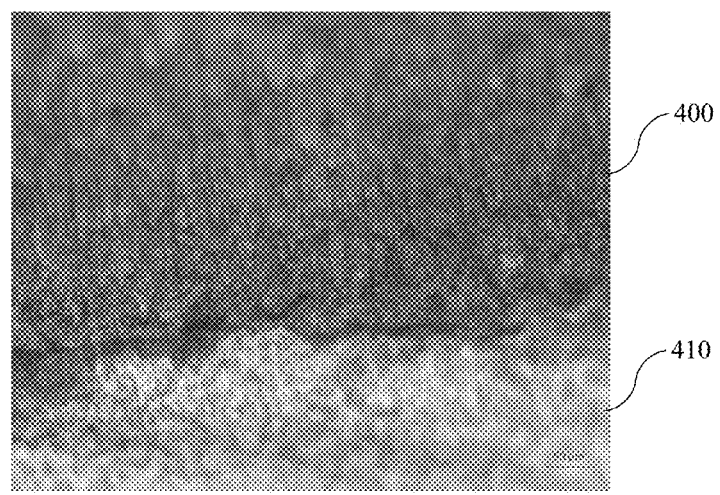
FIG. 4 shows an OM image of a copper substrate comprising an EHD-coated and uncoated region according to embodiments of the present technology.

FIGS. 3 and 4 depict OM images of EHD-coated substrates according to embodiments of the present technology. FIG. 3 illustrates an OM image of a partially EHD-coated piece of aluminum foil. As shown, the carbonaceous material utilized includes individual graphene sheets. Areas 300 and 310 denote the non-EHD coated and EHD-coated areas of the aluminum foil, respectively, which allows measurement of the thickness of the formed coating. Similarly, FIG. 4 illustrates an OM image of a partially EHD-coated piece of copper foil. Areas 400 and 410 depict the EHD-coated and non-EHD coated areas of the copper foil, respectively.

Figure 5A:
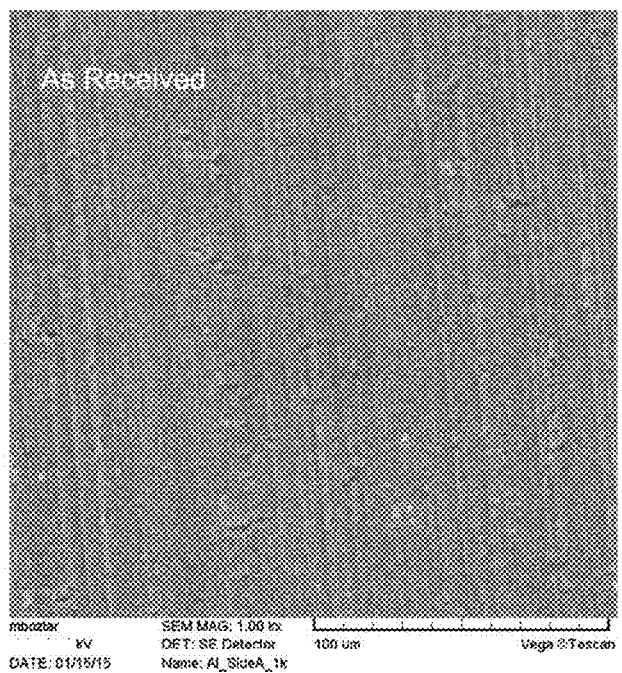
FIG. 5A-5B show a scanning electron microscopy ("SEM") image of the aluminum foil substrate of FIG. 3 according to embodiments of the present technology.
Figure 5B:
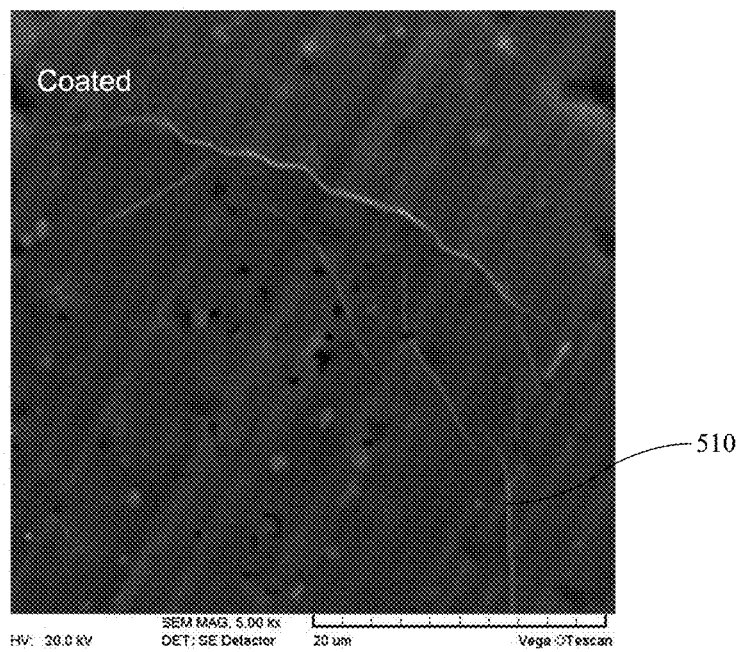

FIGS. 5A-5B depict an SEM image of the aluminum foil sample of FIG. 3 according to embodiments of the present technology. FIG. 5A shows an SEM image of the aluminum foil sample prior to undergoing an EHD process according to the present technology. As shown, the aluminum foil may be an as-received material to be incorporated in a battery as a current collector. As shown in the image, the material includes extensive pitting of the surface. FIG. 5B shows an SEM image of the aluminum foil sample subsequent to undergoing an EHD process according to the present technology. FIG. 5B is included under a higher magnification that facilitates viewing of the wrinkles of the carbonaceous material 510, which illustrates the coverage of the material upon formation. As illustrated, the EHD coating covers the pitting, and may provide a continuous barrier to electrolyte penetration that may otherwise be in contact with the current collector material.

Figure 6A:
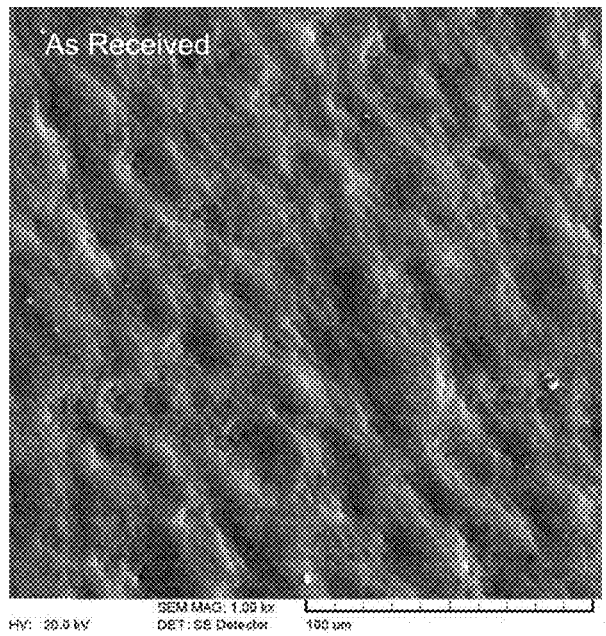
FIG. 6A-6B show a SEM image of the copper substrate of FIG. 4 according to embodiments of the present technology.
Figure 6B:
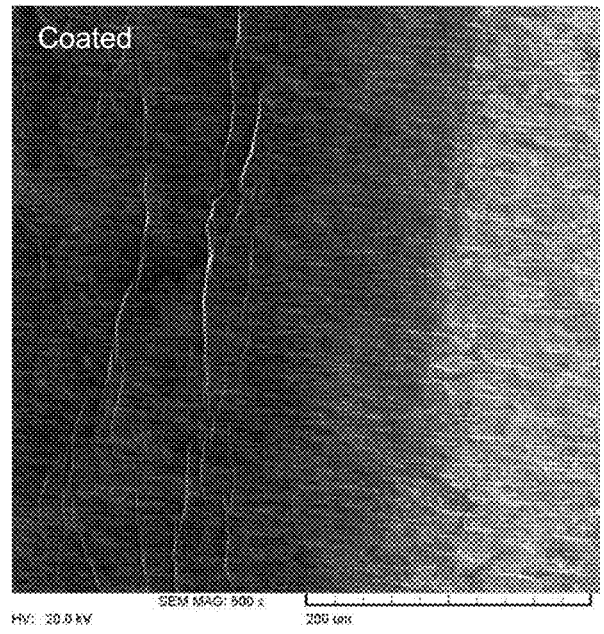

FIGS. 6A-6B show an SEM image of the copper foil sample of FIG. 4 according to embodiments of the present technology. FIG. 6A shows an SEM image of the copper foil sample prior to undergoing EHD processing according to the present technology. Again, the image shows an as received copper substrate that includes extensive surface features. FIG. 6B shows an SEM image of the copper foil sample subsequent to undergoing EHD processing according to the present technology, which illustrates a continuously coated material that may be essentially unaffected by the surface features of the copper. The coating that includes layers of graphene sheets evenly covers the copper substrate.

Figure 7:
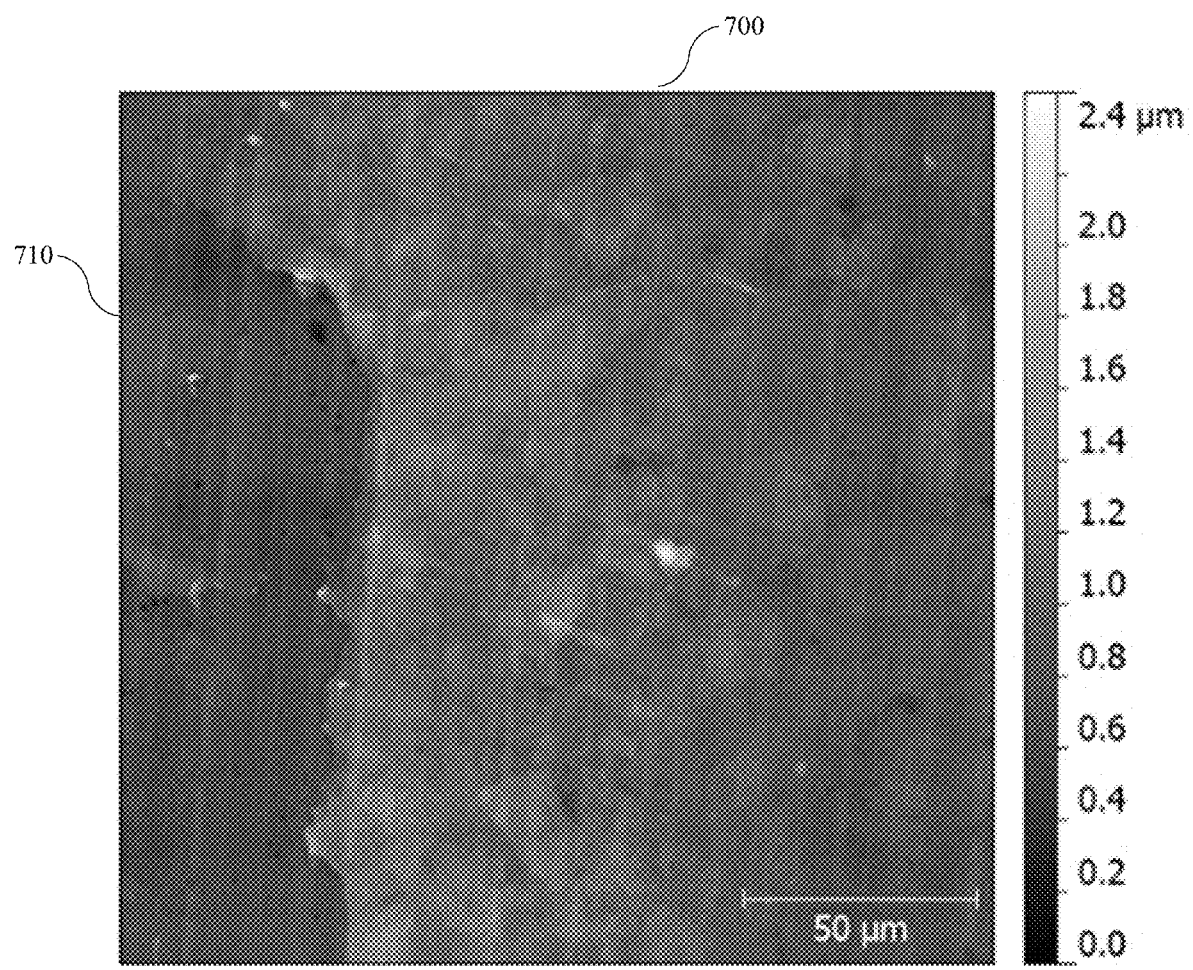
FIG. 7 shows an AFM image of the aluminum foil substrate of FIG. 3 according to embodiments of the present technology.

FIG. 7 depicts an AFM image of an aluminum foil sample partially coated using EHD processing according to embodiments of the present technology. Areas 710 and 700 refer to non-EHD coated and EHD-coated areas of the aluminum foil sample, respectively. Area 700 includes a coating thickness that is up to 200 nm, which reflects a continuous coating. Surface resistance was measured with a 4-point conductivity apparatus. Essentially no change in the surface resistance of the sample of FIG. 7 was observed across the coated and uncoated regions of the sample. For example, measured sheet resistance of areas 710 and 700 were 2.28 m$\Omega$/square±0.6 and 2.30 m$\Omega$/square±0.7, respectively. Hence, addition of the coating resulted in a difference in measured sheet resistance of no greater than about 0.02 m$\Omega$/square. Depending on the coating materials used and the material coated, the coating may cause an increase in measured sheet resistance of less than or about 0.5 me/square, less than or about 0.4 m$\Omega$/square, less than or about 0.3 me/square, less than or about 0.2 me/square, less than or about 0.1 me/square, less than or about 0.05 me/square, less than or about 0.04 m$\Omega$/square, less than or about 0.03 m$\Omega$/square, less than or about 0.02 me/square, less than or about 0.01 me/square, or less than or about 0.001 m$\Omega$/square in embodiments.

Figure 8:
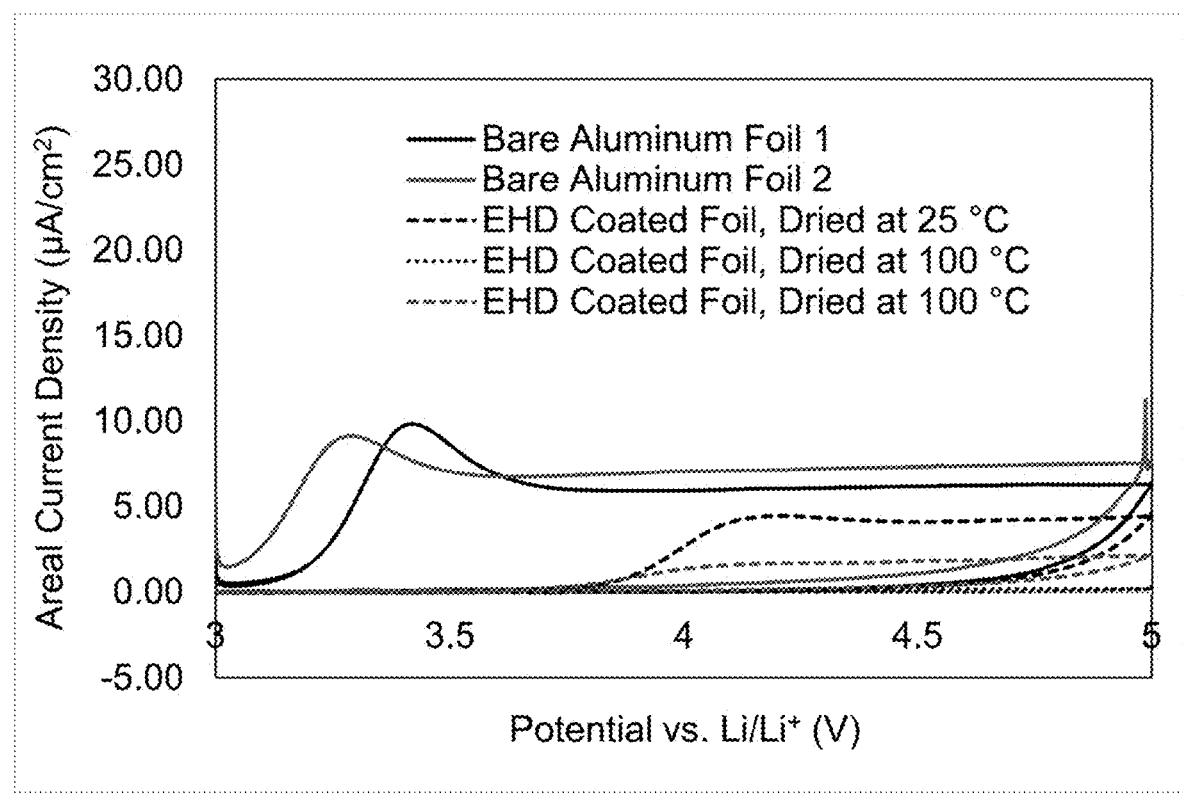
FIG. 8 shows a cyclic voltammogram ("CV") graph for multiple materials according to embodiments of the present technology.
Figure 9A:
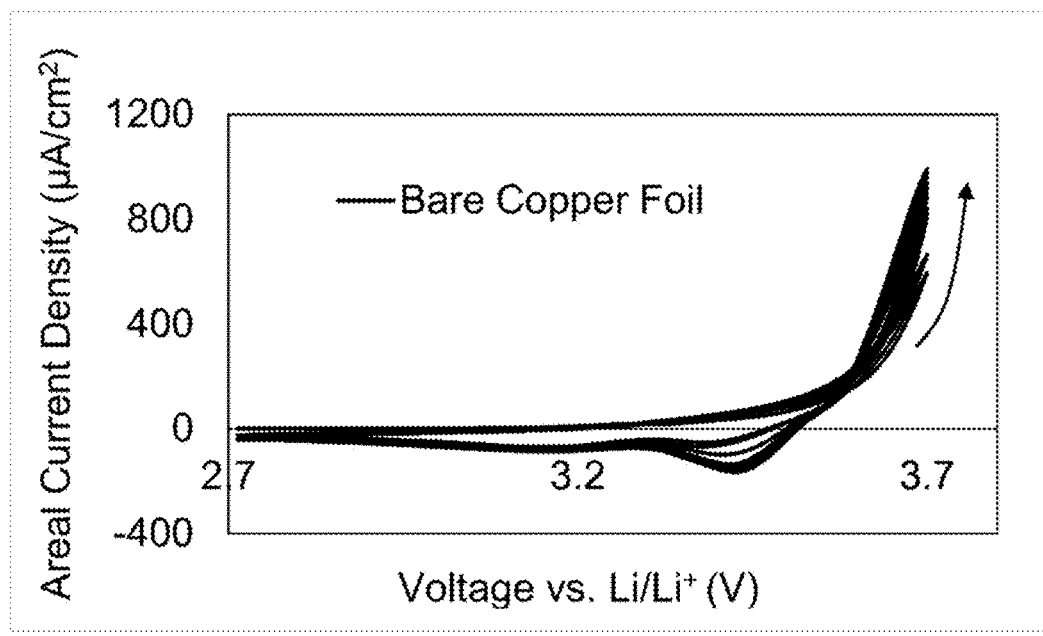
FIGS. 9A-9B show CV graphs of coated and uncoated copper foils according to embodiments of the present technology.
Figure 9B:
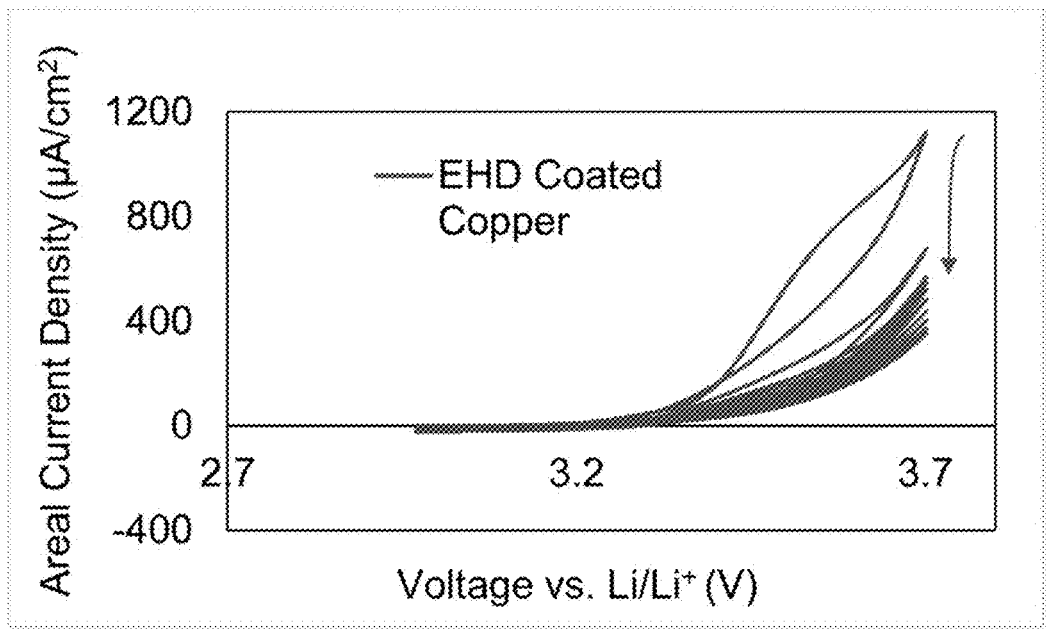

FIGS. 8 and 9A-9B show cyclic voltammetry ("CV") charts according to embodiments of the present technology. Samples were dried at different temperatures to ascertain whether drying temperature may have an impact on CVs. FIG. 8 is a CV of the aluminum foil sample previously discussed having non-EHD coated and EHD-coated areas. CVs were performed in a 3-electrode setup with 1 mL of electrolyte and with a 0.25 inch diameter working area, where a platinum wire was presoaked in electrolyte to form a passivation layer. As shown, the CV reflects a delay and diminution of the oxidation peak of coated aluminum foil at 3.3-3.5 V vs. Li/Li+ compared to the non-coated aluminum foil. FIG. 9B illustrates that the EHD coated copper foil lacks the reduction peak shown in FIG. 9A for the uncoated sample that is characteristic of lithium dissolution and plating in a lithium ion battery electrolyte. Accordingly, the graphene coating of the present technology may reduce the breakdown of materials within the battery cell.

Figure 10A:
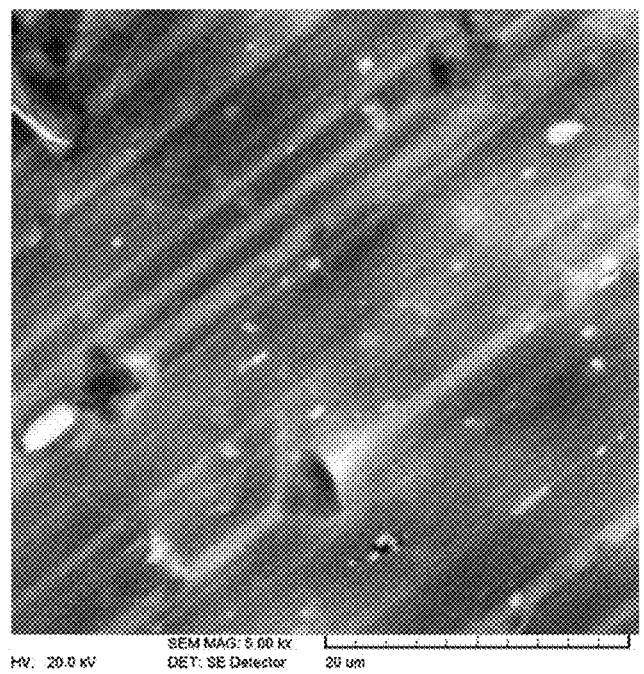
FIGS. 10A-10B show SEM images of a coated aluminum foil substrate according to embodiments of the present technology.
Figure 10B:
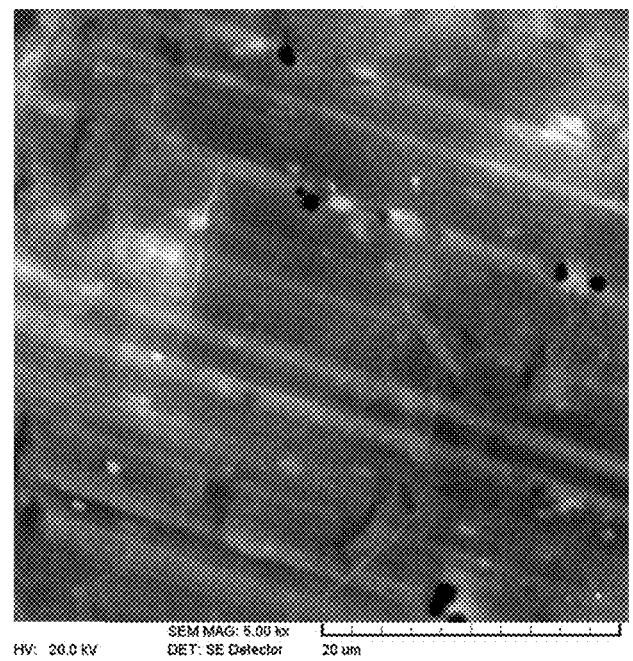

FIGS. 10A-10B show SEM image of the EHD-coated foils previously discussed according to embodiments of the present technology subsequent CV cycling as discussed above. Specifically, FIG. 10A shows that the coating on the aluminum foil is present after 300 cycles processing, and FIG. 10B shows that the coating on the copper foil is present after 300 cycles processing, which illustrates that the coating may further protect an underlying current collector from degradation. This may increase the useable life of battery materials, for example. Accordingly, batteries or current collectors including the carbon-containing material layers described may be configured to resist intersheet infiltration of a battery electrolyte. In embodiments, the coatings may be configured to resist intersheet infiltration of a battery electrolyte after at least 50 CV cycles at 5 mV/s. The coatings may also be configured to resist infiltration after at least 100 CV cycles at 5 mV/s, at least 150 CV cycles at 5 mV/s, at least 200 CV cycles at 5 mV/s, at least 250 CV cycles at 5 mV/s, at least 300 CV cycles at 5 mV/s, at least 350 CV cycles at 5 mV/s, at least 400 CV cycles at 5 mV/s, at least 450 CV cycles at 5 mV/s, at least 500 CV cycles at 5 mV/s, or more in embodiments.

Figure 11A:
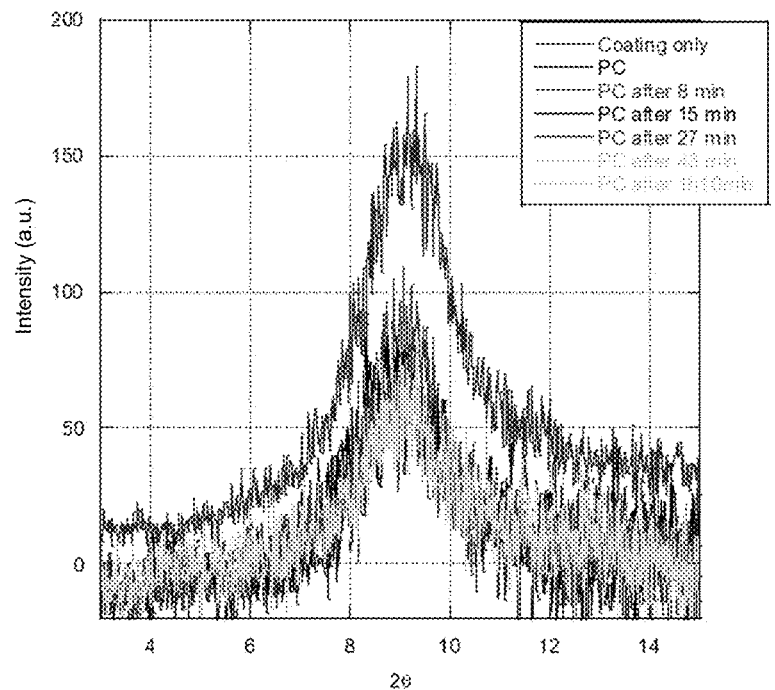
FIGS. 11A-11B show X-ray diffraction ("XRD") patterns of coated and uncoated materials according to embodiments of the present technology.
Figure 11B:
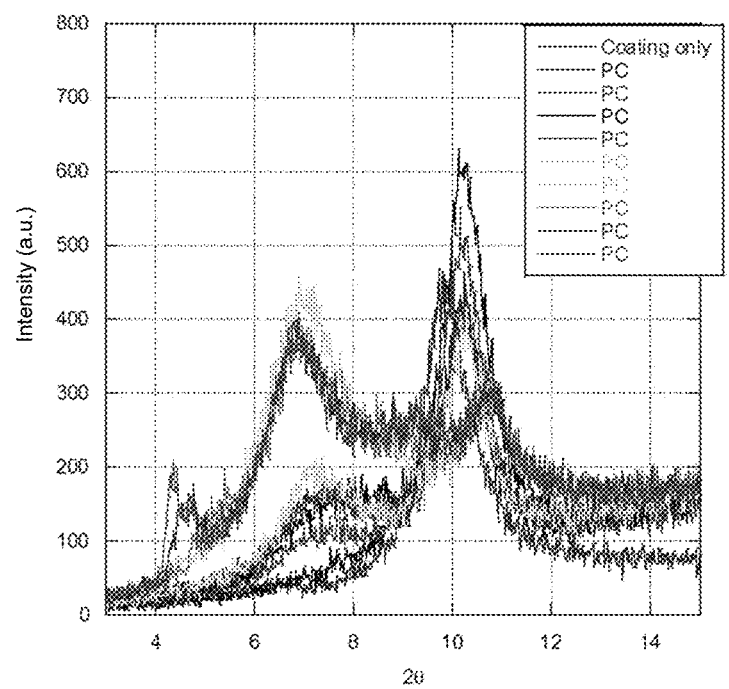

FIGS. 11A-11B show XRD patterns of materials according to embodiments of the present technology. FIG. 11A shows an XRD pattern for EHD coated aluminum foil exposed to propylene carbonate. The coating included layers of graphene sheets as previously described. FIG. 11B depicts the data for evaporatively consolidated coated aluminum foil exposed to propylene carbonate. Propylene carbonate was utilized in these experiments as a representative of a typical solvent used in battery electrolytes. For example, a lithium-ion battery may utilize propylene carbonate as an electrolyte material along with other solvents, and it was therefore used to mimic a battery environment. FIG. 11A reflects no change in the spacing of the graphene sheets after one hour of immersion in the solvent at room temperature. This result indicates that the solvent has not infiltrated between the layered sheets of the coating. Forming a continuous coating of layers of graphene sheets may protect the underlying substrate in this way. FIG. 11B reflects that the coating made by evaporative means displays peak shifts over the same period of time, which indicates that the solvent has begun to infiltrate the coating layers. Accordingly, coatings that may include similar materials but formed by a different process may not produce an adequate barrier, unlike the present technology.

In order to increase the structural integrity of the coating on the current collector during the charge and discharge of the battery and to further decrease the permeability of the coating to liquid and/or vapors, the coating can be cross-linked to provide a fixed spacing between the individual graphene sheets. For example, in embodiments the layers of graphene sheets may be cross-linked to further reinforce the coating.

The cross-linking operation may be performed prior to undergoing EHD coating or subsequent to undergoing EHD coating. The cross-linked coating can be prepared with a variety of cross-linkers, bifunctional compounds including but not limited to diols, such as ethylene glycol, diamino compounds, such as ethylene diamine, dihalogeno compounds, bifunctional compounds bearing two different functional groups including but not limited to alcohol/amine, alcohol/halogen, amine/halogen, as well as any bifunctional compounds that can react with the individual graphene sheets to produce cross-linked graphene sheets.

The cross-linking operation may be performed using a variety of solvents or mixture of solvents when the cross-linking is performed prior to or while undergoing EHD coating. Examples of applicable cross-linking solvents can include, but are not limited to, water, ammoniated water, organic solvents, alcohols, including ethanol or isopropanol, water/alcohol mixtures, including ethanol/water or isopropanol/water, esters and carbonates, including ethylene carbonate or propylene carbonate, dimethylformamide (DMF), N-methylpyrrolidone (NMP), acetonitrile, and/or dimethylsulfoxide (DMSO).

The cross-linking may be performed in the presence of a catalyst including but not limited to an acid catalyst or a base catalyst. The cross-linking operation may be performed between about 20° C. to about 180° C. in embodiments. Additionally, the cross-linking operation may be performed at a temperature up to, greater than, or about 20° C., greater than or about 40° C., greater than or about 60° C., greater than or about 80° C., greater than or about 100° C., greater than or about 120° C., greater than or about 140° C., greater than or about 160° C., or greater than or about 180° C. in embodiments. The cross-linking may also be performed at any range included within any of these ranges.

Figure 12A:
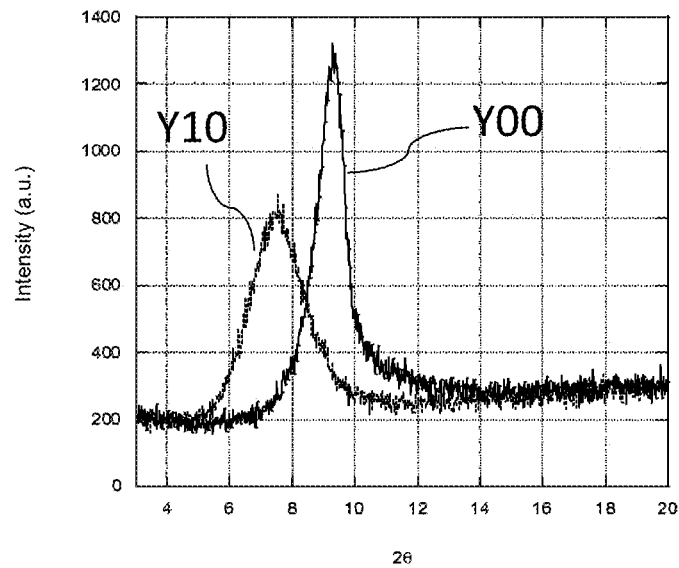
FIGS. 12A-12C show XRD patterns for coated materials according to embodiments of the present technology.
Figure 12B:
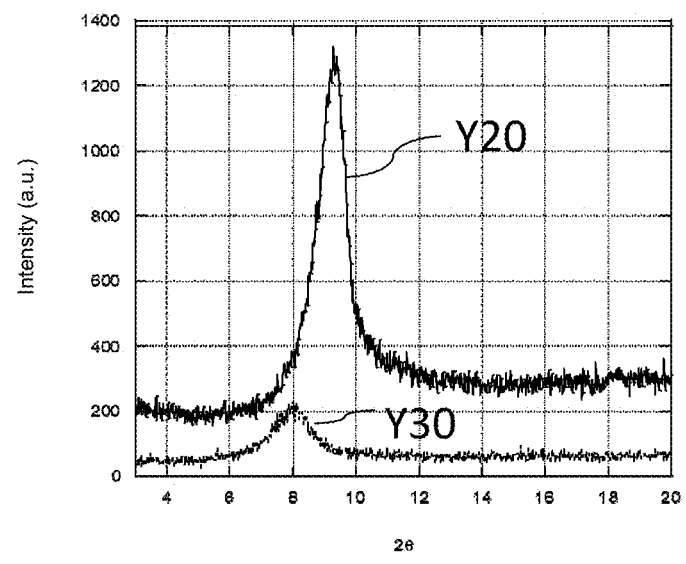
Figure 12C:
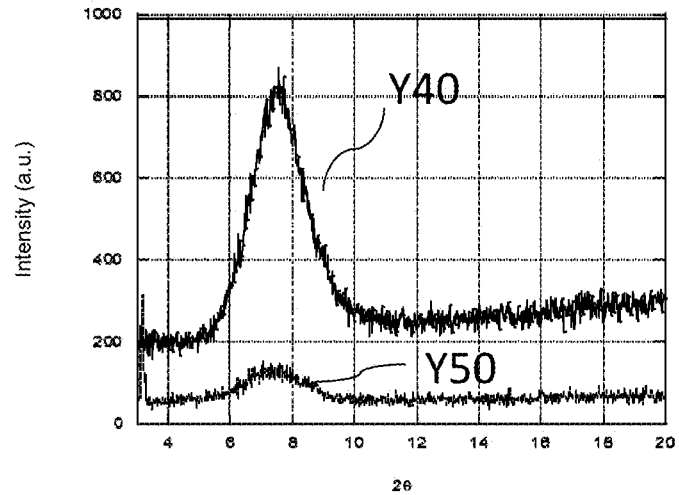

FIGS. 12A-12C show x-ray powder diffraction ("XRD") patterns versus time graphs for various materials according to embodiments of the present technology. FIG. 12A illustrates the data for EHD coated aluminum foil, peak Y00, and for cross-linked EHD coated aluminum, peak Y10. The difference in d-spacing between peaks Y00 and Y10 may be due to the presence of the cross-linker molecule between the carbonaceous material. FIG. 12B illustrates the data for EHD coated aluminum foil exposed to methanol. FIG. 12C illustrates the data for cross-linked EHD coated aluminum foil exposed to methanol. Methanol is a solvent that may be used in swelling test experiments due to its relatively small molecule size, which may allow a test of whether the molecule may infiltrate between layers of the carbonaceous material, as well as methanol affinity for carbonaceous material. FIG. 12B shows that the EHD coating displays a shift in the d-spacing of the graphene sheets between peaks Y20 (dried state) and Y30 (wet state), after 5 min of exposure of the solvent. This may indicate that the solvent has begun to infiltrate the coating layering. FIG. 12C illustrates no change in the d-spacing of the cross-linked graphene sheets, as reflected by the lack of a shift between peaks Y40 (dried state) and Y50 (wet state), over the same period of time of a 5 minutes exposure. This may indicate that the solvent has not infiltrated between the layered sheets of the EHD-coated cross-linked individual graphene sheets. Thus, the cross-linking may further reduce permeability through the network of graphene sheets, which may reduce electrolytic contact with the current collector on which the coating may have been formed.

Figure 13A:
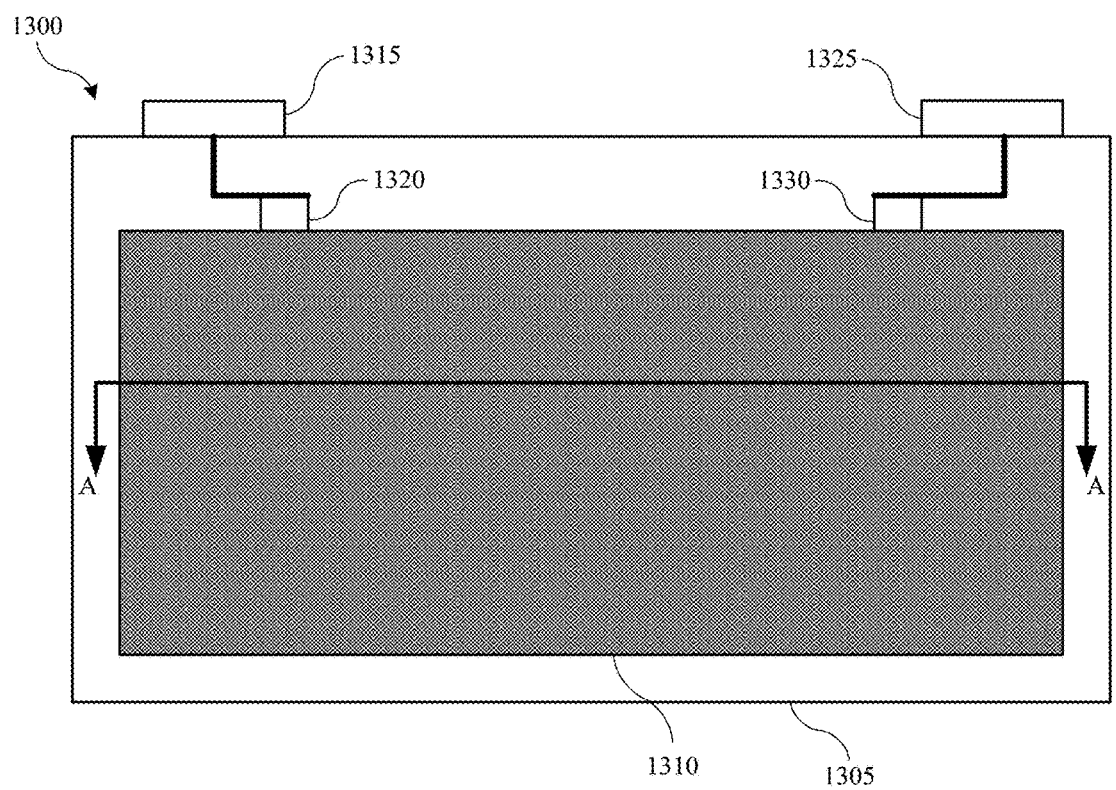
FIG. 13A shows a schematic view of an energy storage device according to embodiments of the present technology.

Turning to FIG. 13A is shown a schematic view of an energy storage device 1300 according to embodiments of the present technology. Energy storage device 1300 may be a battery cell or may be a composite battery, and in embodiments may be a lithium-ion battery. Energy storage device 1300 may be characterized by a number of structural configurations including a cylindrical cell design, a jelly roll design, a pouch design, or a prismatic design, for example. As illustrated, energy storage device 1300 may include an enclosure 1305 housing a number of cell components. Enclosure 1305 may be or include a pouch, a shell, a housing, or a hard-casing in embodiments, which may be made of or include a metal or a metal-containing material. Enclosure 1305 may also be made of an insulative material in embodiments.

Enclosure 1305 may house cell material 1310, which may be a jelly roll or layers of material as further discussed with reference to FIG. 13B below. The cell material 1310 may be electrode materials for an anode and cathode of an electrochemical cell. Enclosure 1305 may also include cathode or positive external terminal 1315 and anode or negative external terminal 1325, which both may be accessible at an external location of the enclosure 1305. Terminals 1315 and 1325 may include an internally accessible face and an externally accessible face with respect to the enclosure 1305 such that the interior cell components can be electrically coupled with an external load. The internally accessible faces of the terminals 1315 and 1325 may be electrically coupled with a cathode tab 1320 and an anode tab 1330 respectively, which may be housed within the enclosure and coupled with the cell material 1310 in embodiments.

More specifically, cathode tab 1320 may be electrically coupled with the positive external terminal of the battery enclosure 1305, and anode tab 1330 may be electrically coupled with the negative external terminal 1325. Although illustrated with electrical lines between the terminals and tabs, the electrical couplings between the terminals and tabs may take any number of forms including direct couplings, bonding pads, or trace lines connecting the components. Additionally, in some embodiments certain of the illustrated features may not be included. For example, exemplary devices may not include a terminal and tab as separable elements, and may instead be characterized by a common material element operating as both features.

Figure 13B:
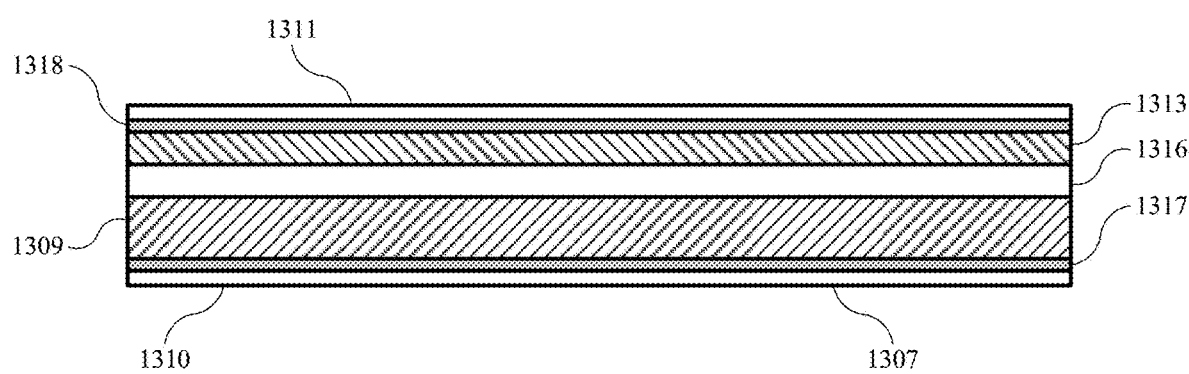
FIG. 13B shows a cross-sectional view along line A-A of FIG. 13A according to embodiments of the present technology.

FIG. 13B shows a cross-sectional view along line A-A of FIG. 13A according to embodiments of the present technology. This view shows exemplary layers of cell material 1310, each layer of which may be housed within enclosure 1305 of FIG. 13A. As illustrated, the figure shows in cross-section a cell material or layers of a cell. As would be readily understood, the layers are not shown at any particular scale, and are intended merely to show the possible layers of cell material 1310. In embodiments, cell material 1310 may include additional layers of material, including additional cell materials to provide additional capacity to battery 1300, as would be readily appreciated by the skilled artisan. Cell material 1310 is not included to limit the disclosure in any way, but merely to provide an illustration of one possible incorporation of a current collector coating as discussed throughout the present disclosure. Cell material 1310 may include a cathode current collector 1307, which may be coupled with a cathode electrode material or active material 1309. In embodiments, cathode current collector 1307 may be aluminum, and may also be alternative metals or conductive materials that may be stable at potentials above about 3 V, for example. Cathode current collector 1307 may be coated or coupled with a cathode active material 1309, or cathode active material 1309 may be disposed on cathode current collector 1307. In embodiments cathode active material 1309 may include a lithium-containing compound.

Cell material 1310 may also include an anode current collector 1311, which may be coupled with an anode electrode material or active material 1313. Anode current collector 1311 may be copper in embodiments, and may also be alternative metals or conductive materials that may be stable at potentials below about 1 V, for example. Anode current collector 1311 may be coated or coupled with anode active material 1313, or anode active material 1313 may be disposed on anode current collector 1311. In embodiments anode active material 1313 may include a carbon-containing compound in embodiments, or may include a lithium-containing compound in embodiments. A separator 1316 may be disposed between the electrodes, and may be a polymer film or a material that may allow lithium ions to pass through its structure while not otherwise conducting electricity.

The current collectors 1307, 1311 may include portions that are uncoated with electrode or active material. These portions may be or include the tabs discussed previously. Accordingly, each cathode current collector 1307 may include cathode tab 1320, which may be an uncoated portion of the cathode current collector. Similarly, each anode current collector 1311 may include anode tab 1330, which may be an uncoated portion of the anode current collector. In these situations, the tab may be the same material as the current collector. However, alternative metals or conductive materials may be used for the tabs in embodiments as well.

As noted above, although illustrated as one cell of layers of electrode material, cell material 1310 may be any number of layers or cells in different embodiments, which may be a function of the active materials used and the ways the cells are joined electrically. Although the cell may be composed of one layer each of anode and cathode material as sheets, the layers may also be formed into a jelly roll design or folded design, such that any number of layers may be included in cell material 1310. For embodiments which include multiple layers, the tab portions of each anode current collector may be coupled together in a number of ways, as may be the tab portions of each cathode current collector.

At least one of cathode current collector 1307 or anode current collector 1311 of cell material 1310 may include an additional layer of material disposed between the current collector and the associated electrode active material. For instance, cell material 1310 may optionally include one or both layers 1317, 1318, which may be or include a continuous layer of a carbon-containing material as discussed throughout the present disclosure. In some embodiments, cell material 1310 may include both layers 1317 and 1318 adjacent the respective current collectors. The carbon-containing material 1317, 1318 may be or include stacked sheets of graphene in a staggered formation between layers. In embodiments, the stacked sheets may include multiple layers of sheets, and may include at least two sheets. In embodiments, the layers may include up to or at least about 10 layers, up to or at least about 100 layers, up to or at least about 1,000 layers, up to or at least about 10,000 layers, or more layers depending on the thickness of the coating. In some embodiments carbon-containing material 1317, 1318 may not be continuously coated across the layers, and may instead be graded or shaped across the associated current collector, as previously explained. The carbon-containing material included in cell materials 1310 may be characterized by any of the properties previously discussed.

In some embodiments the carbon-containing material that may be included in one or both of layers 1317, 1318 may be modified either before, during, or after formation on the respective current collector. For example, the carbon-containing material may be adjusted to have reduced oxygen content. Additionally, the carbon-containing material may be cross-linked to provide cross-linked layers of graphene, for example, disposed on at least one of the current collectors 1307, 1311. In other embodiments the carbon-containing material may be or include an additional carbon-containing material.

The carbon-containing material may be the product of an electrohydrodynamically deposited solution of carbon-containing material, in embodiments, and may be electrohydrodynamically deposited graphene, carbon black, a graphite-containing material, or other carbon-containing materials, any of which may be mixed or included in or with a solution or solvent. The electrohydrodynamic deposition may include any of the operations or process conditions previously described. The electrohydrodynamic deposition may, for example, induce a lateral movement of graphene sheets along the substrate or current collector surface to form the continuous layers of carbon-containing materials. Once formed, the layers or sheets may be devoid of solvent, substantially devoid of solvent, or essentially devoid of solvent between the layers along the surface of the substrate or current collector. The solvent may be excluded during the interlayer formation, which may produce stacked layers having an interlayer separation or distance of less than or about 10 nm. The lateral movement of the deposition may also induce stiction between the layers along the surface of the substrate.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A lithium-ion battery comprising:
 a cathode active material;
 a cathode current collector on which the cathode active material is disposed;
 an anode active material; and
 an anode current collector on which the anode active material is disposed;
 wherein at least one current collector of the cathode current collector or the anode current collector comprises a continuous layer of a single crystalline carbon-containing material positioned between the current collector and the active material, and wherein the continuous layer of carbon-containing material comprises cross-linked layers of graphene disposed on the at least one current collector.

2. The lithium-ion battery of claim 1, wherein the cathode current collector and the anode current collector each comprise at least one of aluminum, copper, stainless steel, gold, or silver.

3. The lithium-ion battery of claim 1, wherein the continuous layer of carbon-containing material comprises stacked sheets of graphene in a staggered formation between layers.

4. The lithium-ion battery of claim 3, wherein the continuous layer of carbon-containing material comprises at least two layers of sheets of graphene positioned along a surface of the current collector.

5. The lithium-ion battery of claim 4, wherein a spacing between the at least two layers of sheets of graphene is less than or about 10 nm.

6. The lithium-ion battery of claim 3, wherein a thickness of the continuous layer of carbon-containing material is between about 50 nm and about 500 nm.

7. The lithium-ion battery of claim 6, wherein the continuous layer of carbon-containing material is positioned along the cathode current collector, wherein the cathode current collector comprises aluminum, and wherein the thickness of the continuous layer of carbon-containing material is between about 50 nm and about 150 nm.

8. The lithium-ion battery of claim 6, wherein the continuous layer of carbon-containing material is positioned along the anode current collector, wherein the anode current collector comprises copper, and wherein the thickness of the continuous layer of carbon-containing material is between about 200 nm and about 300 nm.

9. The lithium-ion battery of claim 1, wherein a continuous layer of carbon-containing material is included adjacent both the cathode current collector and the anode current collector between the respective current collector and the active material disposed thereon.

10. The lithium-ion battery of claim 1, wherein the continuous layer of carbon-containing material comprises a reduced oxygen content from heat-treatment of the carbon-containing material or chemical reduction of the carbon-containing material.

11. The lithium-ion battery of claim 1, wherein the continuous layer of carbon-containing material when formed on the at least one current collector produces an increase in measured sheet resistance of the current collector of less than or about 0.2 m$\Omega$/square.

12. A battery current collector comprising:
 a substrate; and
 a coating in contact with a surface of the substrate, wherein the coating comprises individual sheets of graphene disposed in layers along the surface of the substrate, wherein the individual sheets of graphene are cross-linked with one another on the surface of the substrate, and wherein the continuous layer of carbon-containing material comprises cross-linked layers of graphene.

13. The battery current collector of claim 12, wherein the substrate comprises a conductive material including at least one of aluminum, copper, stainless steel, gold, or silver.

14. The battery current collector of claim 12, wherein the coating is the product of an electrohydrodynamically deposited solution of graphene in solvent.

15. The battery current collector of claim 14, wherein the cross-linked sheets of graphene are devoid of solvent between the layers along the surface of the substrate.

16. The battery current collector of claim 14, wherein the coating is configured to resist intersheet infiltration of a battery electrolyte after at least 200 CV cycles at 5 mV/s.

17. The battery current collector of claim 14, wherein the electrohydrodynamic deposition forms an induced stiction between the layers along the surface of the substrate.

18. A lithium-ion battery comprising:
 a cathode active material;
 a cathode current collector on which the cathode active material is disposed, wherein the cathode current collector comprises an aluminum substrate on which a continuous coating of cross-linked layers of sheets of graphene is formed;
 an anode active material; and
 an anode current collector on which the anode active material is disposed, wherein the anode current collector comprises a copper substrate on which a continuous coating of cross-linked layers of sheets of graphene is formed.

19. The battery of claim 18, wherein the continuous coating of cross-linked layers of sheets of graphene formed on the copper substrate comprises a 5 V electrohydrodynamically deposited coating characterized by a thickness of at least about 200 nm, and wherein the continuous coating of cross-linked layers of sheets of graphene formed on the aluminum substrate comprises a 40 V electrohydrodynamically deposited coating characterized by a thickness of at least about 50 nm.

* * * * *